United States Patent [19]
Muller

[11] 3,909,894
[45] Oct. 7, 1975

[54] METHOD OF END-CONTACTING ELECTRICAL CAPACITORS

[75] Inventor: Ulrich Muller, Regensburg, Germany

[73] Assignee: Siemens Aktiengesellschaft, Berlin & Munich, Germany

[22] Filed: Feb. 4, 1974

[21] Appl. No.: 439,570

[30] Foreign Application Priority Data
Feb. 7, 1973 Germany.............................. 2305999

[52] U.S. Cl. ............. 29/25.42; 117/50; 117/102 A; 317/260
[51] Int. Cl.² ......................................... H01G 7/00
[58] Field of Search ........... 29/25.42, 605; 317/260; 117/213, 47 R, 48, 49, 50, 102 R, 102 A

[56] References Cited
UNITED STATES PATENTS

| | | | |
|---|---|---|---|
| 2,673,792 | 3/1954 | Gulton | 29/25.42 |
| 2,978,098 | 4/1961 | Post | 29/605 |
| 3,227,934 | 1/1966 | Schill | 317/260 |
| 3,244,953 | 4/1966 | Walsh et al. | 317/260 |
| 3,260,906 | 7/1966 | Kellerman | 317/260 |
| 3,292,243 | 12/1966 | Hofling | 29/605 |
| 3,334,413 | 8/1967 | Smith | 29/605 |
| 3,783,480 | 1/1974 | Booe | 29/25.42 |

*Primary Examiner*—Carl E. Hall
*Attorney, Agent, or Firm*—Hill, Gross, Simpson, Van Santen, Steadman, Chiara & Simpson

[57] ABSTRACT

A method of end-contacting electrical capacitors which includes the step of extracting a wax film from the end faces of the foils forming the capacitor winding. Extraction of the wax film takes place in a vessel supplied with a circulating solvent. Reels of capacitor foils are suspended within the solvent in such a manner as to allow wax extraction at the end faces of the reels.

7 Claims, 1 Drawing Figure

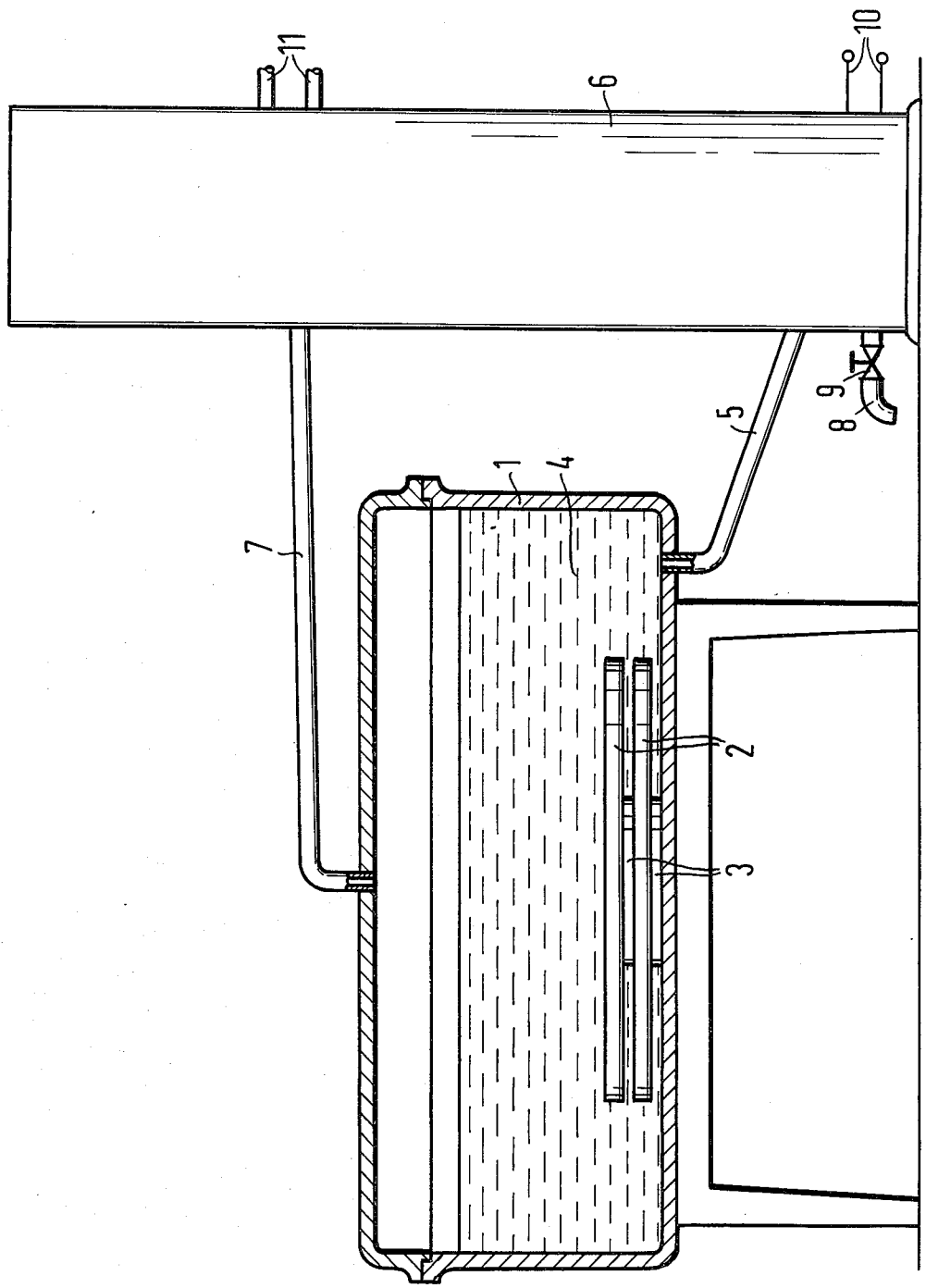

METHOD OF END-CONTACTING ELECTRICAL CAPACITORS

BACKGROUND OF THE INVENTION

Wax residues or wax films are generally present in capacitors which have been produced by forming a coil from bonded foils or which have been built using foils that have been manufactured by the application of varnish films to a carrier foil. In the first case, the wax is used for adhesion between the bonded foils, and in the second case the wax serves to give the carrier foil a smooth finish and makes it possible to peel away the capacitor foil after the varnish-applying operation. The present invention provides a means for extracting the wax residue from the edges of the foil, thereby making it possible to permit end contacting by the Schoop process.

SUMMARY OF THE INVENTION

It is an important feature of the present invention to provide a method for end-contacting electrical capacitors.

It is also a feature of the present invention to provide a method for end-contacting electrical capacitors which have wax films disposed on the foils.

It is a principal object of the present invention to provide a method for end-contacting electrical capacitors which involves the extraction of wax films from the edge of the foils.

It is another object of the present invention to provide a method for end-contacting electrical capacitors which involves the extraction of wax residues formed on the edges of the capacitor foils by means of suspending reels of such foils in a vessel containing a circulating extraction fluid.

These and other objects, features and advantages of the present invention will be understood in greater detail from the following description and the associated drawing wherein reference numerals are utilized to designate a preferred embodiment.

DESCRIPTION OF THE DRAWING

FIG. 1 is a sectional view of a vessel containing reels of capacitor foil showing the use of the extraction solvent to remove wax from the edges of the foils. This FIGURE also shows an elevational view of a rectification column where the dissolved wax is separated from the solvent.

DESCRIPTION OF THE PREFERRED EMBODIMENT

The present invention relates to a method of end-contacting electrical capacitors and, in particular, to end-contacting the capacitors which have a wax film or a wax residue disposed thereon as a result of the manufacturing process. These capacitors generally have the electrodes of respective polarities extending toward each end of the capacitor where the contacting is accomplished.

Capacitors of this kind which have staggered foils are usually contacted at their ends by the Schoop process. In the case of capacitors which are manufactured using wax, a wax film or residue is generally present at the edges of the capacitor which are to be end-contacted by the Schoop process. This is true in capacitors which have been produced by forming a coil from bonded foils or which have been produced using foils that have been coated by a varnish film. In the first case, the wax is used to bring about the adhesion between the foils and, in the second case, the wax gives the carrier foil a smooth finish and makes it possible to unwind the foil. The result of both of these methods is the formation of a wax residue which inhibits the use of the Schoop process to end-contact capacitors.

It is clear that in each of these cases, proper contacting of the electrodes cannot be directly achieved by using the Schoop process. Particularly in the case of capacitors formed by thin varnish films where the capacitor films have been produced on carrier films and subsequently bonded together, poor contact between the end-contact films and the electrodes is experienced.

Accordingly, the object of the present invention is to make end-contacting directly possible in the type of capacitor described above, and this is made possible by the use of a method step in the nature of extraction of the wax films in the vicinity of the end-faces or edges of the foils.

By using an extraction operation in accordance with this invention, the Schoop process can be used effectively since the metal used can more readily penetrate to the edge zones of the electrodes. Also, the metal does not lose its heat due to absorption of heat by melting wax and even evaporation of the wax. By means of the process of the present invention, the scrap rate is actually held within limits conventionally encountered with other kinds of capacitor designs, where otherwise the scrap rate is much higher.

The extraction operation of the present invention can advantageously be accomplished by using light benzine as the solvent. However, if the coils are comprised of three-film foils all of which are laterally staggered in relation to one another, the foils being built up from two thin varnish films and a metal film located between the varnish films and bonded to them, then it is more advantageous to extract the wax from the edges of the coils by means of an ester alcohol mixture. The result is that in the stagger zone, the varnish films are dissolved and the electrodes are exposed. In such a case, the ends of the capacitors can be contacted by press-fitting caps in the axial direction. The exposed films instantly form a welded connection with the metal of the caps and this welded connection is enhanced when the capacitors are used.

If large capacitor coils are to be manufactured, then it is advisable to extract the wax residues or wax films before the capacitor coil is formed. This extraction should be done exclusively in the area of the edges of the foils. Excessive extraction of large capacitor coils could, in some cases, lead to loosening of the coil because of the extraction of a relatively large amount of wax. Extraction exclusively in the area of the ends or edges of the foil can be advantageously performed by arranging the number of supply reels of foils in the widths required in the final capacitor inside an extractor. Intermediate layers are positioned between individual supply reels and between the bottom of the extractor vessel and the bottom of the lowest supply reel to enable the solvent to reach those parts of the supply reels which are to be contacted.

This method of particular extraction is possible because the normally firmly coiled supply reels allow the solvent to penetrate only slowly into ends. Complete extraction of the wax must be avoided in this case to avoid loosening of the coils. The bonding of bonded foils must be held intact at least until the foils have been coiled to form capacitors.

The method of the present invention can be applied to capacitor coils which have been formed using cover foils as well, because, in such cases, unwanted extractions from the outer confines of the capacitor coil must be avoided.

Referring to the figures in greater detail, an extraction vessel 1 holds a pair of supply reels of foils 2. The supply reels are already in the widths required of the foils in the ultimate capacitor. These reels are arranged upon intermediate layers 3 alternately so that the fluid may reach both sides of the reels in order to accomplish the desired extraction. Such a device is referred to as a Soxhlet apparatus. An extraction liquid 4 as described above covers all the supply reels. The wax-enriched extraction liquid is supplied through a discharge pipe 5 to lower part of rectification column 6. In the column 6 the dissolved wax is separated from the solvent.

The solvent is then recycled through a pipe 7 to the extraction vessel and the molten wax is drained off through a valve 9 and a pipe 8 as required. Electrical connections 10 provide current for heating the evaporator of the rectification column, while a connecting pipe 11 supplies coolant to the upper area of the column. By this method the reels 2 can be placed inside the vessel and extraction accomplished at the edges of the foil exclusively, whereby end-contacting may be suitably accomplished.

The invention claimed is:

1. A method of end-contacting an electrical capacitor having electrodes, dielectric films and wax residues on the electrodes, dielectric films and wax residues on the electrodes wherein the electrodes of opposing polarities extend respectively to different ends of the capacitor each electrode having one of its edges adjacent the capacitor end to which it extends, said capacitor comprising a plurality of wound foils comprising the steps of winding the capacitor foils, putting the wound foils in an extraction vessel containing a wax solvent to extract wax from the edges of the electrodes and expose the same, removing the foil from the extraction vessel, and electrically contacting the exposed electrode edges of the finished capacitor.

2. A method in accordance with claim 1 wherein the capacitor is removed from the extraction vessel after the wax at the edges of the electrodes is extracted only.

3. A method in accordance with claim 2 wherein wax solvent comprises light benzine.

4. A method of end contacting a mutually laterally offset three-film foil electrical capacitor, said three-film foil being formed of two thin varnish films and an intermediate bonded metal film, said capacitor comprising a plurality of said foils, comprising the steps of:

winding the capacitor foils, putting the wound foils in an extraction vessel containing an ester-alcohol mixture, retaining the foils in the mixture until the varnish films are dissolved in the laterally offset zone at the edges of the wound foils to expose said edges, removing the foils and electrically contacting the exposed electrode edges of the finished capacitor.

5. A method in accordance with claim 4 wherein the ends of the capacitor are contacted by pressure fitting caps.

6. A method in accordance with claim 1 wherein the wax residues are extracted before the final capacitor is wound and wherein the extraction is confined to the edges of the foil.

7. A method as set forth in claim 6 wherein at least one supply reel of the width required in the final capacitor is introduced into a Soxhlet extractor apparatus; and in that between individual supply reels and between the base of the Soxhlet apparatus and the bottom-most supply reel, intermediate layers are placed which allow the solvent to penetrate to the parts of the supply reels which are to be contacted.

* * * * *